United States Patent

[11] 3,620,341

| [72] | Inventor | John D. L. Gardner<br>401 Houston First Saving Bldg., Houston, Tex. |
|---|---|---|
| [21] | Appl. No. | 845,962 |
| [22] | Filed | July 30, 1969 |
| [45] | Patented | Nov. 16, 1971 |

[54] HOT FOOD DISPENSING MACHINE
1 Claim, 7 Drawing Figs.

[52] U.S. Cl. ..................................................... 194/10,
221/110, 221/150 HC
[51] Int. Cl. ....................................................... G07f 11/72
[50] Field of Search ......................................... 194/10;
221/103, 110, 150, 150 A, 150 HC, 279

[56] References Cited
UNITED STATES PATENTS

| 2,925,194 | 2/1960 | Mihalek | 221/279 X |
| 3,237,745 | 3/1966 | Gerhart et al. | 194/10 |
| 3,333,666 | 8/1967 | Murray et al. | 194/10 |
| 3,386,550 | 6/1968 | Murray et al. | 194/10 |
| 3,482,509 | 12/1969 | Gardner | 221/150 X |

Primary Examiner—Robert B. Reeves
Assistant Examiner—David A. Scherbel
Attorney—Ranseler O. Wyatt ABSTRACT: A dispensing machine for maintaining food in cold storage, and, in response to coin deposits, a selection from a variety of foods may be accomplished, and the food so selected automatically delivered into a microwave cooking unit and quickly cooked, and delivered to a delivery tray where it may be received by the buyer.

J. D. L. Gardner
INVENTOR.

BY

ATTORNEY

J. D. L. Gardner
INVENTOR.

BY Pamela O. Wyatt
ATTORNEY

J. D. L. Gardner
INVENTOR.

ATTORNEY

3,620,341

HOT FOOD DISPENSING MACHINE

SUMMARY OF THE INVENTION

A dispensing machine for maintaining food in cold storage and cooking and delivering same in response to a coin deposit, a cold-storage unit having means for maintaining same under refrigeration and food container supporting means movably mounted in said refrigerated units having means for selectively moving one of said supporting means in response to coin deposit, to deliver one food container into a cooking area, and a magnatron unit in said area for cooking said food by microwaves, and a timing element adapted to disconnect said cooking unit and deliver said food container with the hot food therein to a pickup tray upon completion of a preset time cycle.

DESCRIPTION OF THE PREFERRED EMBODIMENT

Figure 1:
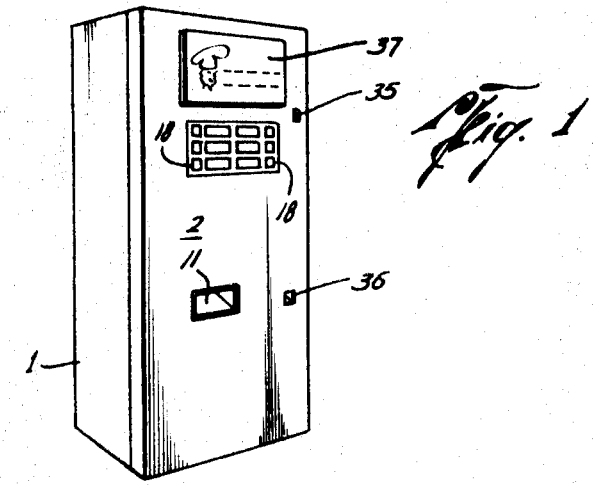
FIG. 1 is a front elevational view, in perspective, of the housing for the dispensing unit.
Figure 2:
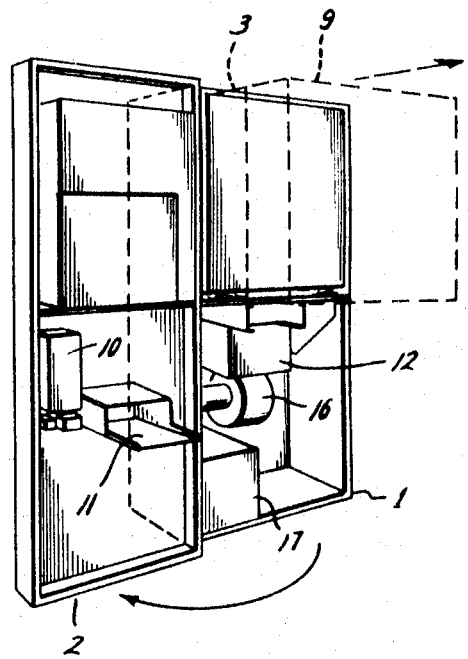
FIG. 2 is a front elevational view of the housing with the door opened, disclosing the interior of the machine.
Figure 3:
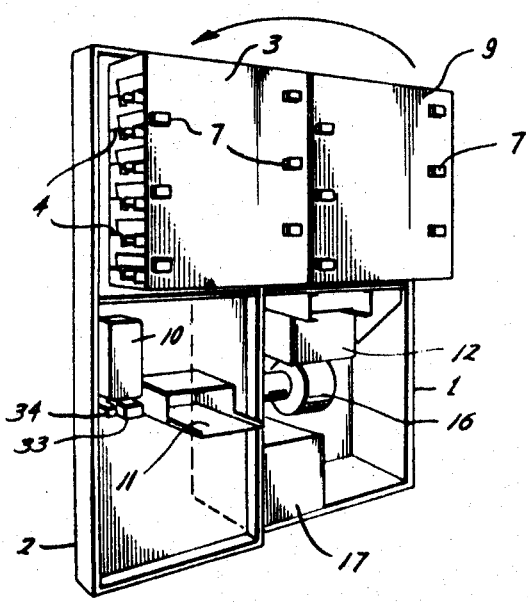
FIG. 3 is a front elevational view of the open housing, showing the food container trays and units for moving same.
Figure 4:
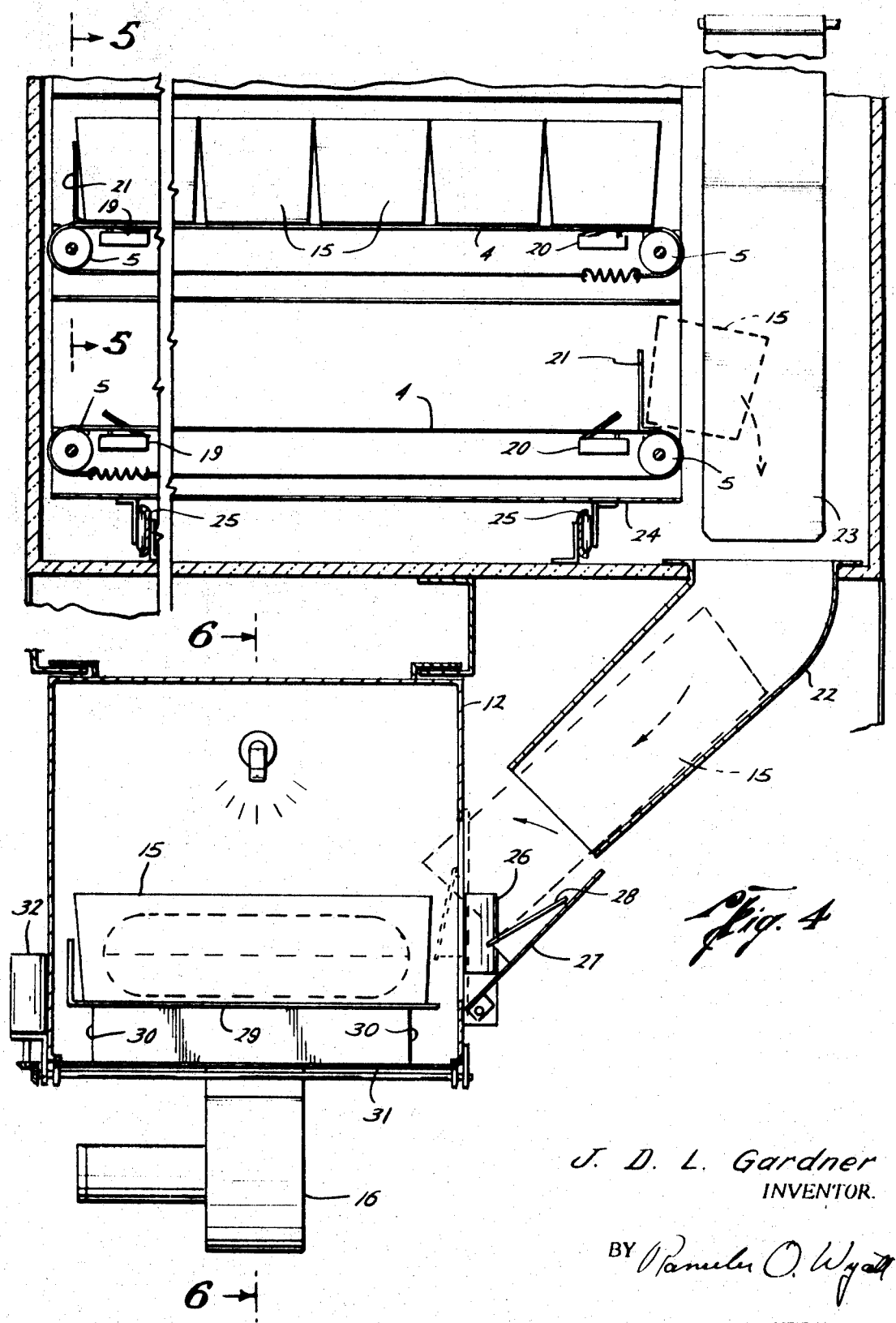
FIG. 4 is an enlarged partial side elevational view of the food storage, delivery and cooking units.
Figure 5:
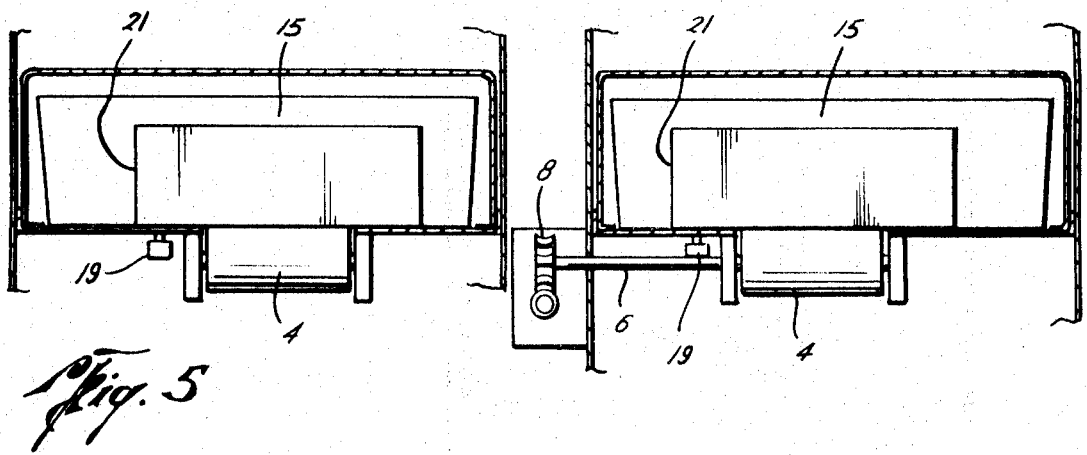
FIG. 5 is an end view of the food container supporting means, taken on the line 5—5 of FIG. 4.
Figure 6:
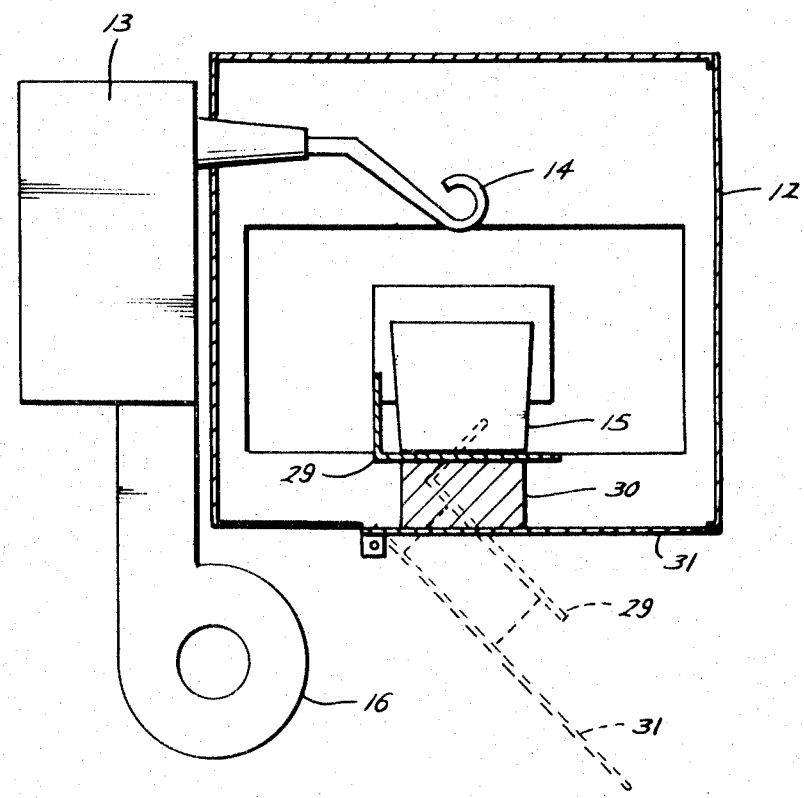
FIG. 6 is a side elevational view of the cooking unit, taken on the line 6—6 of FIG. 4.

In the drawings the numeral 1 designates a housing, such as a metallic cabinet, having the door 2, hinged to the cabinet, and mounted in the door 2 is the serving-tray housing 3 having the serving trays as 4 which are belts moving upon rotation of the rollers as 5, 5. A drive shaft 6 is rotated by the motor 7 through the gear 8, which rotates the rollers 5 and moves the belts 4, 4. A similar housing 9 having food-storage trays, belts and motors, is mounted in the cabinet 1, the location of the motors on the respective housings, being in staggered relation so that the motors in the housing 3 will not contact the motors in the housing 9 when the door 2 is closed.

Also mounted in the door 2 is the coin-receiving box 10 and the delivery tray 11.

In the cabinet 1 is the cooking unit 12 having the microwave unit 13 which produces microwaves which are directed by the element 14 to the food in the container 15 which has be deposited in the cooking unit 12. A fan 16 cools the microwave unit 13. A compressor 17 for the refrigerating unit is also mounted in the cabinet 1, the said refrigerating unit (not shown) being of conventional design.

Each housing 3 and 9 contains a series of food-container supports 4, 4 which are selectively activated through the selector switches 18, 18. At each end of each food support means 4 is a switch as 19, 20. One end of the food support has a vertical plate 21 mounted thereon which bear against the end food container 15. When the last food container on a support as 4 is delivered into the chutes 22, 23, the switch 20 will be released, signalling the switch 19 on the next food support to respond to the next demand.

The food tray supports are mounted in a framework as 24 which is slidably mounted on the tracks 25, 25 within the housing 1, permitting the framework to move outwardly and be resupplied with food containers, which will be loaded on the supports after the plate 21 is moved to rearmost position, closing the switch 19 preparatory to delivering another series of food containers.

The chute 23 is large enough to receive containers from either housing 3 or 9, and terminates in the chute 22, which delivers the food container to the heating unit. A motor 26, in response to a coin deposit, opens the door 27 providing access to the heating unit, through which the container passes, and the spacing unit 28, on the inside wall of the door 27, pushes the container 15 into position under the microwave element 14, on the platform 29, which is mounted on suitable supports 30, 30 which are in turn mounted on the hinged section 31, which is opened and closed by means of the motor 32.

The coin-deposit box is provided with the accepted coin-storage box 33 and the reject box 34. When a selection is made through the selector box 18, and a coin deposit is made into the slot 35, the coins pass through the coinbox 10 where they are scanned and, if found in order, deposited in the accepted coinbox 33, but if, for any reason, such as improper amount, bad coins, or exhausted supply of the selected food, the coins are delivered into the rejection box 34 and are available to the depositor through the reject slot 36. When the coins are accepted and pass into the accepted coin storage box, the appropriate motor 7 is activated rotating the rollers 5, 5 enough to carry the belt 4 forward until one container clears the end of the belt and is delivered into the chutes 22, 23. The motor 26 will be simultaneously activated, opening the door 27 of the cooking unit and the container 15 will pass into the cooking unit and on to the platform 29, and as the door 27 closes, the spacer 28 will bear against the food container and push same to the right position on the platform 29. The microwave element 14 will then be activated and the cooking completed, at which time the microwave unit will be deactivated and the motor 32 activated to open the door 31 and permit the container 15 to slide off of the platform 29 onto the delivery tray 11.

Figure 7:
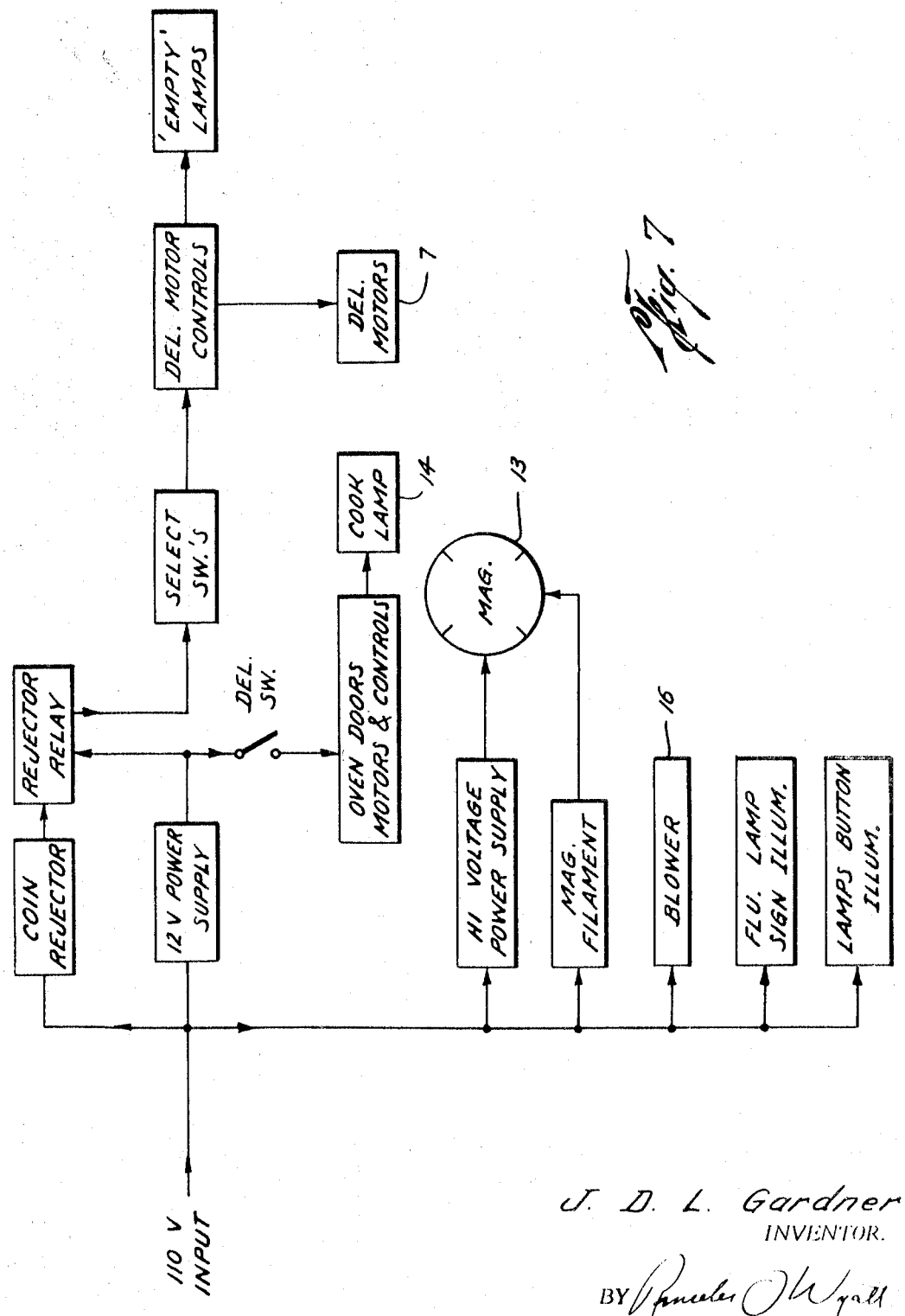
FIG. 7 is an electrical diagram of the circuits employed.

The electric circuit illustrated in FIG. 7, provides for a source of power from the usual 110-volt input; this power operates the coin rejector and the rejector relaw, which are connected into the selector switches, the delivery motor controls and the "empty" lamps, and the delivery motor controls are connected into the delivery motors. A transformer connected into the 110-volt input provides a 12-volt supply to the delivery switch, and to the oven doors motors and controls, and to the cooking lamp. Connected into the 110-volt input are the high-voltage power transformer means, which connects into and supplies power to the magnatron; the magnatron filament supply; the blower, the fluorescent lamp in the sign-illuminating means and the lamp-illuminating means for the buttons 18. The sign-illuminating means will illuminate the sign as 37 when the machine is plugged in.

What is claimed is:

1. In a hot food dispensing machine, a housing having a cabinet and a hinged door, selector buttons mounted in said door and a coin deposit slot and a coin reject tray mounted in said door, a delivery tray mounted in said door, refrigerated food-storage compartments, one section of said food-storage compartments being mounted in said door and another section of said food-storage compartments mounted in said cabinet, a microwave cooking element mounted in said cabinet beneath said storage compartments, longitudinally movable food-container supports mounted in said compartments and means for selectively moving one of said supports in response to a coin deposit and a signal from said selector buttons, and means for guiding said food containers from said food supports into said microwave cooking element and on to a delivery tray, said food-container supports comprising a pair of rollers, independent motors for rotating each pair of rollers and a belt mounted on said rollers, a switch mounted at each end of each of said food supports to activate the respective supports and to transfer the activation to the next support upon exhaustion of the supply of containers on the respective supports.

* * * * *